May 31, 1955 — R. J. ODIERNO — 2,709,533
HANDLE FOR WIREBOUND BOX
Filed Oct. 30, 1951 — 2 Sheets-Sheet 1
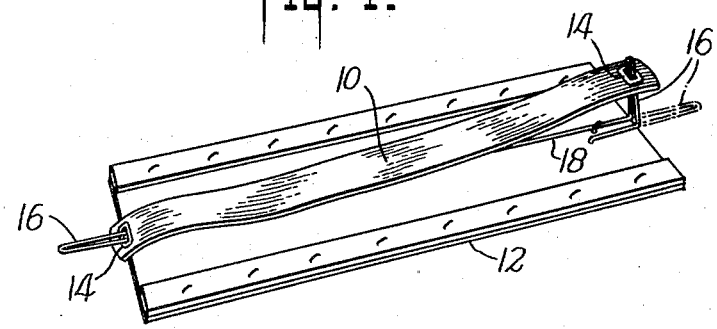
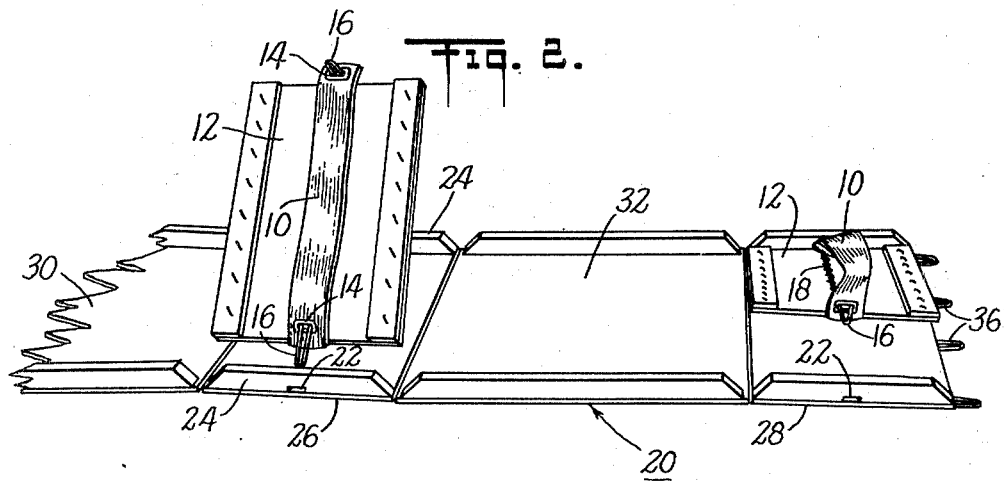
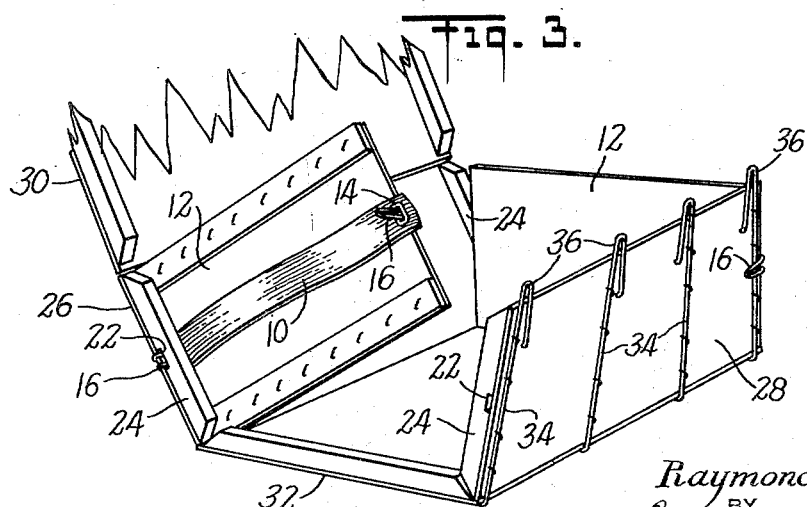
INVENTOR
Raymond J. Odierno
BY
Curtis, Morris & Safford
ATTORNEYS May 31, 1955  R. J. ODIERNO  2,709,533
HANDLE FOR WIREBOUND BOX
Filed Oct. 30, 1951  2 Sheets-Sheet 2

INVENTOR
Raymond J. Odierno
BY
Curtis, Morris + Safford
ATTORNEYS

United States Patent Office 2,709,533
Patented May 31, 1955

2,709,533
HANDLE FOR WIREBOUND BOX

Raymond J. Odierno, Rockaway, N. J., assignor to Stapling Machines Co., Rockaway, N. J., a corporation of Delaware Application October 30, 1951, Serial No. 253,851

1 Claim. (Cl. 217—12)

This invention relates to a handle for wirebound boxes, particularly wirebound boxes of the type having ends attached to the box by means of loops on the ends of binding wires stapled to the box end, and known in the trade as "all-bound boxes."

The invention provides a handle which is attached to one end of the wirebound box by means of wire loops at either end of the handle, which are secured to the box by bending the loops around a part of the box, or by means of grommets or rings adapted to encircle the wire loops on the box end. This job of attaching the handles requires no special tools and may be accomplished during setup of the boxes without materially increasing the time normally required. These handles, when not in use, do not extend beyond the ends of the boxes, allowing the boxes to be stacked end-to-end. The handles may be quite economically fabricated, yet the handles themselves and the means by which they are attached to the boxes are strong enough to carry substantial loads.

The handles described herein are equally well adapted for use in wirebound boxes (a term generally used to refer to containers having no openings in any face) and in wirebound crates (containers with openings in one or more faces). For convenience of expression, throughout the present application, the term "box" will be used generically to refer to both types of containers.

In the figures, in which several illustrative embodiments of the invention are shown, Figure 1 is a perspective view of an all-bound box end, with a handle embodying features of the invention shown in the process of being attached thereto, preparatory to attaching the end to the box blank;

Figure 2 is a partial perspective view of an all-bound box blank with one box end and its respective handle already attached to the box end and with the other box end and handle in position to be attached;

Figure 3 is a partial perspective view of the box blank, showing it in the process of being set up to form a box;

Figure 4:
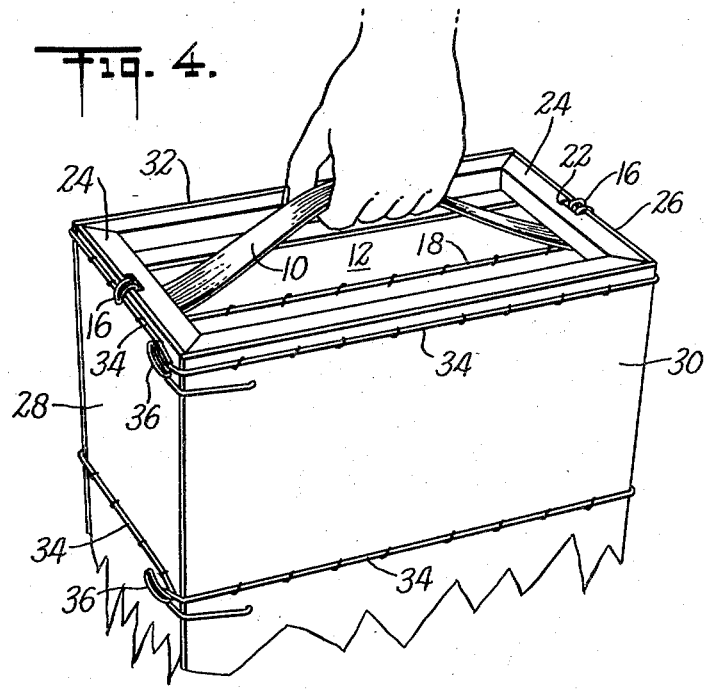
Figure 4 is a partial perspective view of one end of the assembled box being carried by the handle.

The handle shown in Figure 1 comprises a flexible strap 10 of fabric webbing of a length slightly exceeding the width of the box end 12, and having near each end openings surrounded by reinforcing grommets 14, which are adapted to fit over the wire loops 16 at each end of the binding wire 18 stapled to the box end. In Figure 1, the handle is shown with the grommet 14 at its left-hand end already in place on the wire loop 16 at one side of the box end and with the grommet at its right-hand end in position to be slipped over the wire loop at the other side. The wire loop 16 at the right-hand side of the box end has been bent upwardly from its original position (shown in broken lines) so that the grommet will reach the end of the loop.

After the handle is thus positioned on the box end 12, the box end is attached to the box blank 20, as shown in Figure 2, by inserting the wire loop 16 at one side of the box end through a notch 22 in the outside cleat 24 at one side of one of the four sections 26 of the box blank. The end of the wire loop 16 projects beyond the cleat and is bent around the corner of the box as shown in Figures 3 and 4 to fasten one side of the box end hingedly to the box blank. Another box end is similarly attached to the opposite end of the opposite section 28 of the box blank, as shown in Figure 2.

The box blank with the ends attached is normally shipped and stored flat, as illustrated in Figure 2, until use, when it is set up as shown in Figure 3. The four sections of the box blank are folded around to form the top 30, bottom 32, and front and back sides 28 and 26 of the box. The unattached wire loop 16 on each of the box ends is inserted through the notch 22 in the outside cleat on the section of the box opposite to that on which the other wire loop of the box end was previously attached, and the wire loops are bent over to secure the box end, and to hold the bottom and the front and back sides of the box in assembled relation. To the open box thus formed, the box top 30 is hingedly attached by means of the binding wires 34 stapled to the box sections. The box is closed by folding down the top 30 and is held closed by bending the wire loops 36 at one end of each of the binding wires 34 through and over those at the other end of the binding wires, as shown in Figure 4.

The strap 10 of the handle extends across the end of the assembled box, as shown in Figure 4, and may be grasped for lifting and carrying of the box.

Figure 5:
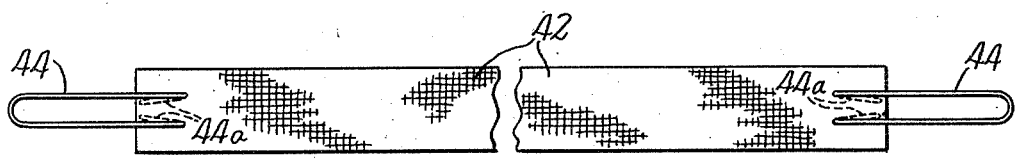
Figures 5 and 6 are plan views of alternative forms of handles within the scope of the present invention.
Figure 6:
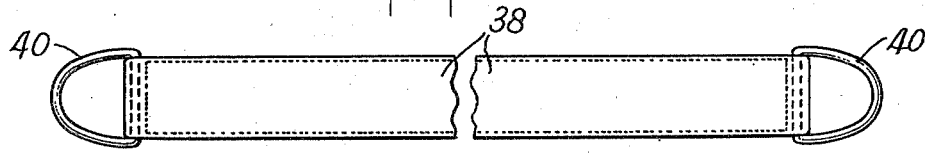

In Figures 5 and 6 are shown alternative forms of handles. The handle shown in Figure 6 is formed of a webbing strap 38 with metal rings 40 secured at its opposite ends by looping over and sewing the strap. The handle is secured to the box by inserting the rings 40 over the wire loops at opposite sides of the box end before the box end is attached to the box, in similar manner to that in which the handle of Figures 1 through 4 is secured.

The handle of Figure 5 is a webbing strap 42 having wire loops 44 extending from either end and attached to the strap 42 by driving the ends 44a of the loops through the fabric of the strap and clinching them over. This handle is attached to the box by inserting the wire loops 44 through the notches 22 in the cleats 26 on opposite sections of the box blank before the wire loops 16 on the box end are inserted, and bending the wire loops 44 around the corner of the box in the same manner as the loops 16.

It will thus be seen that the present invention provides a handle which has the aforementioned and other obvious desirable advantages. It should be emphasized that the particular embodiments shown and described herein are intended merely as illustrative and not as restrictive of the invention.

I claim:

In combination, a wirebound box of the type having notched cleats at the edges at either end of said box and a box end with wire loops extending from each side thereof through said notches and bent around the edges of said box to secure said end to the sides of said box, and a handle for said box, said handle comprising a strap extending across said box end and between said box end and said cleats and having near its ends openings through which said wire loops project to secure said handle to said box.

References Cited in the file of this patent

UNITED STATES PATENTS

| 144,376 | Wilcox | Nov. 4, 1873 |
| 1,298,144 | Yeakel | Mar. 25, 1919 |
| 1,942,970 | Miller | Jan. 9, 1934 |
| 2,277,976 | Helmenstine | Mar. 31, 1942 |

FOREIGN PATENTS

| 23,485 | Great Britain | July 27, 1911 |